United States Patent
Cook

(10) Patent No.: US 8,112,767 B1
(45) Date of Patent: Feb. 7, 2012

(54) SYSTEMS, APPARATUS, AND METHODS FOR LAYERED EXECUTION

(75) Inventor: Randall R. Cook, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 1081 days.

(21) Appl. No.: 11/959,700

(22) Filed: Dec. 19, 2007

Related U.S. Application Data

(63) Continuation-in-part of application No. 11/026,520, filed on Dec. 30, 2004, now Pat. No. 7,620,956, which is a continuation-in-part of application No. 10/459,936, filed on Jun. 11, 2003, now Pat. No. 7,117,495, application No. 11/959,700, which is a continuation-in-part of application No. 11/027,489, filed on Dec. 30, 2004, now Pat. No. 7,496,931, and a continuation-in-part of application No. 11/081,856, filed on Mar. 16, 2005, now Pat. No. 7,512,977, which is a continuation-in-part of application No. 10/459,936, application No. 11/959,700, which is a continuation-in-part of application No. 11/082,194, filed on Mar. 16, 2005, now Pat. No. 7,549,164, which is a continuation-in-part of application No. 10/459,936, application No. 11/959,700, which is a continuation-in-part of application No. 11/324,565, filed on Jan. 3, 2006, now Pat. No. 7,886,291, which is a continuation-in-part of application No. 10/459,936, (Continued)

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................ 719/320; 719/328
(58) Field of Classification Search .................. 719/328, 719/320
See application file for complete search history.

(56) References Cited

U.S. PATENT DOCUMENTS
6,185,574 B1 * 2/2001 Howard et al. ...................... 1/1
(Continued)

OTHER PUBLICATIONS
Schlegel et al, Interfacing Different Layers of a Multilayer Architecture for Sensorimotor Systems using the Object-Oriented Famework Smartsoft, Research Institute for Applied Knowledge Processing, 1999, pp. 1-8.*

(Continued)

*Primary Examiner* — Diem Cao
(74) *Attorney, Agent, or Firm* — Advantedge Law Group

(57) ABSTRACT

The disclosure is directed to systems, apparatus, and methods for layered execution. In one example, a layered execution environment is provided where one or more layers are overlaid over a base operating environment in a manner that they appear to be installed on the local system. The first layer may include a resource associated with one or more resources on a second layer. The resource on the first layer may be monitored to determine when access to the resource is requested. In response to access to the resource of the first layer, the second layer, which comprises the associated resources, may be activated. By activating the second layer only in response to a request to access a resource on the first layer, associated resources may be selectively activated resulting in more efficient execution.

20 Claims, 6 Drawing Sheets

Related U.S. Application Data and a continuation-in-part of application No. 10/459,768, filed on Jun. 11, 2003, now Pat. No. 7,162,724, and a continuation-in-part of applicationNo. 10/459,870, filed on Jun. 11, 2003, now Pat. No. 7,165,260, and a continuation-in-part of application No. 11/026,520, which is a continuation-in-part of application No. 10/459,936, said application No. 11/324,565 is a continuation-in-part of application No. 11/027,489, and a continuation-in-part of application No. 11/081,856, which is a continuation-in-part of application No. 10/459,936, said application No. 11/324,565 is a continuation-in-part of application No. 11/082,194, which is a continuation-in-part of application No. 10/459,936, application No. 11/959,700, which is a continuation-in-part of application No. 11/324,571, filed on Jan. 3, 2006, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,571 is a continuation-in-part of application No. 11/027,489, and a continuation-in-part of application No. 11/081,856, which is a continuation-in-part of application No. 10/459,936, said application No. 11/324,571 is a continuation-in-part of application No. 11/082,194, which is a continuation-in-part of application No. 10/459,936, application No. 11/959,700, which is a continuation-in-part of application No. 11/324,375, filed on Jan. 3, 2006, now Pat. No. 8,010,961, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,375 is a continuation-in-part of application No. 11/027,489, and a continuation-in-part of application No. 11/081,856, which is a continuation-in-part of application No. 10/459,936, said application No. 11/324,375 is a continuation-in-part of application No. 11/082,194, which is a continuation-in-part of application No. 10/459,936, application No. 11/959,700, which is a continuation-in-part of application No. 11/324,607, filed on Jan. 3, 2006, now Pat. No. 7,461,096, which is a continuation-in-part of application No. 10/459,936, and a continuation-in-part of application No. 10/459,768, and a continuation-in-part of application No. 10/459,870, which is a continuation-in-part of application No. 11/026,520, which is a continuation-in-part of application No. 10/459,936, said application No. 11/324,607 is a continuation-in-part of application No. 11/027,489, and a continuation-in-part of application No. 11/081,856, which is a continuation-in-part of application No. 10/459,936, said application No. 11/324,607 is a continuation-in-part of application No. 11/082,194, which is a continuation-in-part of application No. 10/459,936, application No. 11/959,700, which is a continuation-in-part of application No. 11/324,545, filed on Jan. 3, 2006, now Pat. No. 7,542,988, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,545 is a continuation-in-part of application No. 11/027,489, which is a continuation-in-part of application No. 11/081,856, which is a continuation-in-part of application No. 10/459,936, said application No. 11/324,545 is a continuation-in-part of application No. 11/082,194, which is a continuation-in-part of application No. 10/459,936, application No. 11/959,700, which is a continuation-in-part of application No. 11/324,572, filed on Jan. 3, 2006, now Pat. No. 7,877,413, which is a continuation-in-part of application No. 10/459,936, which is a continuation-in-part of application No. 10/459,768, which is a continuation-in-part of application No. 10/459,870, which is a continuation-in-part of application No. 11/026,520, which is a continuation-in-part of application No. 10/459,936, said application No. 11/324,572 is a continuation-in-part of application No. 11/027,489, and a continuation-in-part of application No. 11/081,856, which is a continuation-in-part of application No. 10/459,936, said application No. 11/324,572 is a continuation-in-part of application No. 11/082,194, which is a continuation-in-part of application No. 10/459,936, application No. 11/959,700, which is a continuation-in-part of application No. 11/324,573, filed on Jan. 3, 2006, now Pat. No. 7,461,086, which is a continuation-in-part of application No. 10/459,936, and a continuation-in-part of application No. 10/459,768, which is a continuation-in-part of application No. 10/459,870, and a continuation-in-part of application No. 11/026,520, which is a continuation-in-part of application No. 10/459,936, said application No. 11/324,573 is a continuation-in-part of application No. 11/027,489, and a continuation-in-part of application No. 11/081,856, which is a continuation-in-part of application No. 10/459,936, said application No. 11/324,573 is a continuation-in-part of application No. 11/082,194, which is a continuation-in-part of application No. 10/459,936, application No. 11/959,700, which is a continuation-in-part of application No. 11/324,496, filed on Jan. 3, 2006, now Pat. No. 7,970,789, which is a continuation-in-part of application No. 10/459,936, and a continuation-in-part of application No. 10/459,768, and a continuation-in-part of application No. 10/459,870, which is a continuation-in-part of application No. 11/026,520, which is a continuation-in-part of application No. 10/459,936, said application No. 11/324,496 is a continuation-in-part of application No. 11/027,489, which is a continuation-in-part of application No. 11/081,856, which is a continuation-in-part of application No. 10/459,936, said application No. 11/324,496 is a continuation-in-part of application No. 11/082,194, which is a continuation-in-part of application No. 10/459,936, application No. 11/959,700, which is a continuation-in-part of application No. 11/528,858, filed on Sep. 28, 2006, now Pat. No. 7,945,897, which is a continuation-in-part of application No. 10/459,936, and a continuation-in-part of application No. 10/459,768, which is a continuation-in-part of application No. 10/459,870, which is a continuation-in-part of application No. 11/026,520, which is a continuation-in-part of application No. 10/459,936, said application No. 11/528,858 is a continuation-in-part of application No. 11/027,489, which is a continuation-in-part of application No. 11/081,856, which is a continuation-in-part of application No. 10/459,936, said application No. 11/528,858 is a continuation-in-part of application No. 11/082,194, which is a continuation-in-part of application No. 10/459,936, said application No. 11/528,858 is a continuation-in-part of application No. 11/324,565, which is a continuation-in-part of application No. 10/459,936, and a continuation-in-part of application No. 10/459,768, and a continuation-in-part of application No. 10/459,870, said application No. 11/324,565 is a continuation-in-part of application No. 11/026,520, which is a continuation-in-part of application No. 10/459,936, said application No. 11/324,565 is a continuation-in-part of application No. 11/027,489, which is a continuation-in-part of application No. 11/081,856, which is a continuation-in-part of application No. 10/459,936, said application No. 11/324,565 is a continuation-in-part of application No. 11/082,194, which is a continuation-in-part of application No. 10/459,936, said application No. 11/528,858 is a continuation-in-part of application No. 11/324,571, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,571 is a continuation-in-part of application No. 11/027,489, and a continuation-in-part of application No. 11/081,856, which is a continuation-in-part of application No. 10/459,936, said application No. 11/324,571 is a continuation-in-part of application No. 11/082,194, which is a continuation-in-part of application No. 10/459,936, said application No. 11/324,545 is a continuation-in-part of application No. 10/459,936, said application No. 11/528,858 is a continuation-in-part of application No. 11/324,375, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,375 is a continuation-in-part of application No. 11/027,489, and a continuation-in-part of application No. 11/081,856, which is a continuation-in-part of application No. 10/459,936, said application No. 11/324,375 is a continuation-in-part of application No. 11/082,194, which is a continuation-in-part of application No. 10/459,936, said application No. 11/528,858 is a continuation-in-part of application No. 11/324,607, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,607 is a continuation-in-part of application No. 11/027,489, and a continuation-in-part of application No. 11/081,856, which is a continuation-in-part of application No. 10/459,936, said application No. 11/324,607 is a continuation-in-part of application No. 11/082,194, which is a continuation-in-part of application No. 10/459,936, said application No. 11/528,858 is a continuation-in-part of application No. 11/324,545, which is a continuation-in-part of application No. 10/459,936, and a continuation-in-part of application No. 10/459,768, and a continuation-in-part of application No. 10/459,870, and a continuation-in-part of application No. 11/026,520, said application No. 11/324,545 is a continuation-in-part of application No. 11/027,489, which is a continuation-in-part of application No. 11/081,856, which is a continuation-in-part of application No. 10/459,936, said application No. 11/324,545 is a continuation-in-part of application No. 11/082,194, which is a continuation-in-part of application No. 10/459,936, said application No. 11/528,858 is a continuation-in-part of application No. 11/324,572, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,572 is a continuation-in-part of application No. 11/027,489, and a continuation-in-part of application No. 11/081,856, which is a continuation-in-part of application No. 10/459,936, said application No. 11/324,572 is a continuation-in-part of application No. 11/082,194, which is a continuation-in-part of application No. 10/459,936, said application No. 11/528,858 is a continuation-in-part of application No. 11/324,573, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,573 is a continuation-in-part of application No. 11/027,489, and a continuation-in-part of application No. 11/081,856, which is a continuation-in-part of application No. 10/459,936, said application No. 11/324,573 is a continuation-in-part of application No. 11/082,194, which is a continuation-in-part of application No. 10/459,936, said application No. 11/528,858 is a continuation-in-part of application No. 11/324,496, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,496 is a continuation-in-part of application No. 11/027,489, which is a continuation-in-part of application No. 11/081,856, which is a continuation-in-part of application No. 10/459,936, said application No. 11/324,496 is a continuation-in-part of application No. 11/082,194, which is a continuation-in-part of application No. 10/459,936.

(60) Provisional application No. 60/387,969, filed on Jun. 12, 2002, provisional application No. 60/533,388, filed on Dec. 30, 2003.

(56) References Cited

U.S. PATENT DOCUMENTS 7,599,907 B2 * 10/2009 Havewala et al. ............... 1/1
7,680,758 B2 * 3/2010 Laborczfalvi et al. . 707/999.001
2008/0276261 A1 * 11/2008 Munshi et al. ............... 719/328

OTHER PUBLICATIONS

Shen et al, A Grid Service based Model of Virtual Experiment, Shanghai Jiaotong Univ., 2003, pp. 1-5.*

* cited by examiner

SYSTEMS, APPARATUS, AND METHODS FOR LAYERED EXECUTION

CROSS-REFERENCE

This is a continuation-in-part of U.S. patent application Ser. No. 11/026,520 filed Dec. 30, 2004, which: (1) claims the benefit of U.S. provisional patent application Ser. No. 60/533,388 filed on Dec. 30, 2003; and (2) is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. No. 11/027,489 filed Dec. 30, 2004, which claims the benefit of U.S. provisional patent application Ser. No. 60/533,388 filed on Dec. 30, 2003.

This is a continuation-in-part of U.S. patent application Ser. Nos. 11/081,856 and 11/082,194, each filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. Nos. 11/324,565, 11/324,571, 11/324,375, 11/324,607, 11/324,545, 11/324,572, 11/324,573 and 11/324,496, each filed Jan. 3, 2006, and each of which is: (1) a continuation-in-part of U.S. patent application Ser. Nos. 10/459,936 (now U.S. Pat. No. 7,117,495 issued Oct. 3, 2006), 10/459,768 (now U.S. Pat. No. 7,162,724 issued Jan. 9, 2007), and 10/459,870 (now U.S. Pat. No. 7,165,260 issued Jan. 16, 2007) filed Jun. 11, 2003, which each claim the benefit of U.S. provisional patent application Ser. No. 60/387,969 filed on Jun. 12, 2002; (2) a continuation-in-part of U.S. patent application Ser. No. 11/026,520 filed Dec. 30, 2004, which claims the benefit of U.S. provisional patent application Ser. No. 60/533,388 filed on Dec. 30, 2003; (3) a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (4) a continuation-in-part of U.S. patent application Ser. No. 11/027,489 filed Dec. 30, 2004, which claims the benefit of U.S. provisional patent application Ser. No. 60/533,388 filed on Dec. 30, 2003; and (5) a continuation-in-part of U.S. patent application Ser. Nos. 11/081,856 and 11/082,194, each filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. No. 11/528,858 filed Sep. 28, 2006, which is: (1) a continuation-in-part of Ser. No. 10/459,936 (now U.S. Pat. No. 7,117,495 issued Oct. 3, 2006), Ser. No. 10/459,768 (now U.S. Pat. No. 7,162,724 issued Jan. 9, 2007), and Ser. No. 10/459,870 (now U.S. Pat. No. 7,165,260 issued Jan. 16, 2007) filed Jun. 11, 2003, which each claim the benefit of U.S. provisional patent application Ser. No. 60/387,969 filed on Jun. 12, 2002; (2) a continuation-in-part of U.S. patent application Ser. Nos. 11/026,520 filed Dec. 30, 2004, which claims the benefit of U.S. provisional patent application Ser. No. 60/533,388 filed on Dec. 30, 2003 and is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (3) a continuation-in-part of U.S. patent application Ser. No. 11/027,489 filed Dec. 30, 2004, which claims the benefit of U.S. provisional patent application Ser. No. 60/533,388 filed on Dec. 30, 2003; (4) a continuation-in-part of U.S. patent application Ser. Nos. 11/081,856 and 11/082,194 each filed on Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (5) and a continuation-in-part of U.S. patent application Ser. Nos. 11/324,565, 11/324,571, 11/324,375, 11/324,607, 11/324,545, 11/324,572, 11/324,573 and 11/324,496 filed Jan. 3, 2006, each of which is: (a) a continuation-in-part of U.S. patent application Ser. Nos. 10/459,936 (now U.S. Pat. No. 7,117,495 issued Oct. 3, 2006), 10/459,768 (now U.S. Pat. No. 7,162,724 issued Jan. 9, 2007), and 10/459,870 (now U.S. Pat. No. 7,165,260 issued Jan. 16, 2007) filed Jun. 11, 2003, which each claim the benefit of U.S. provisional patent application Ser. No. 60/387,969 filed on Jun. 12, 2002; (b) a continuation-in-part of U.S. patent application Ser. No. 11/026,520 filed Dec. 30, 2004, which claims the benefit of U.S. provisional patent application Ser. No. 60/533,388 filed on Dec. 30, 2003; (c) a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (d) a continuation-in-part of U.S. patent application Ser. No. 11/027,489 filed Dec. 30, 2004, which claims the benefit of U.S. provisional patent application Ser. No. 60/533,388 filed on Dec. 30, 2003; and (e) a continuation-in-part of U.S. patent application Ser. Nos. 11/081,856 and 11/082,194 filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

The disclosures of the above patents and patent applications are hereby incorporated by reference in their entirety.

BACKGROUND INFORMATION

A traditional view of virtualization involves executing one or more virtual machines on a server, with each virtual machine running one or more applications. Often, each application is presented with its own operating environment via a dedicated virtual machine. The virtual machines that execute on a computing system prevent conflicts between applications as well as between applications and an operating system. However, traditional virtualization carries considerable overhead that hinders efficiency.

BRIEF DESCRIPTION OF THE DRAWINGS

Various embodiments are described with reference to the accompanying drawings, wherein like reference numbers designate like elements, and in which.

DETAILED DESCRIPTION

Figure 1:
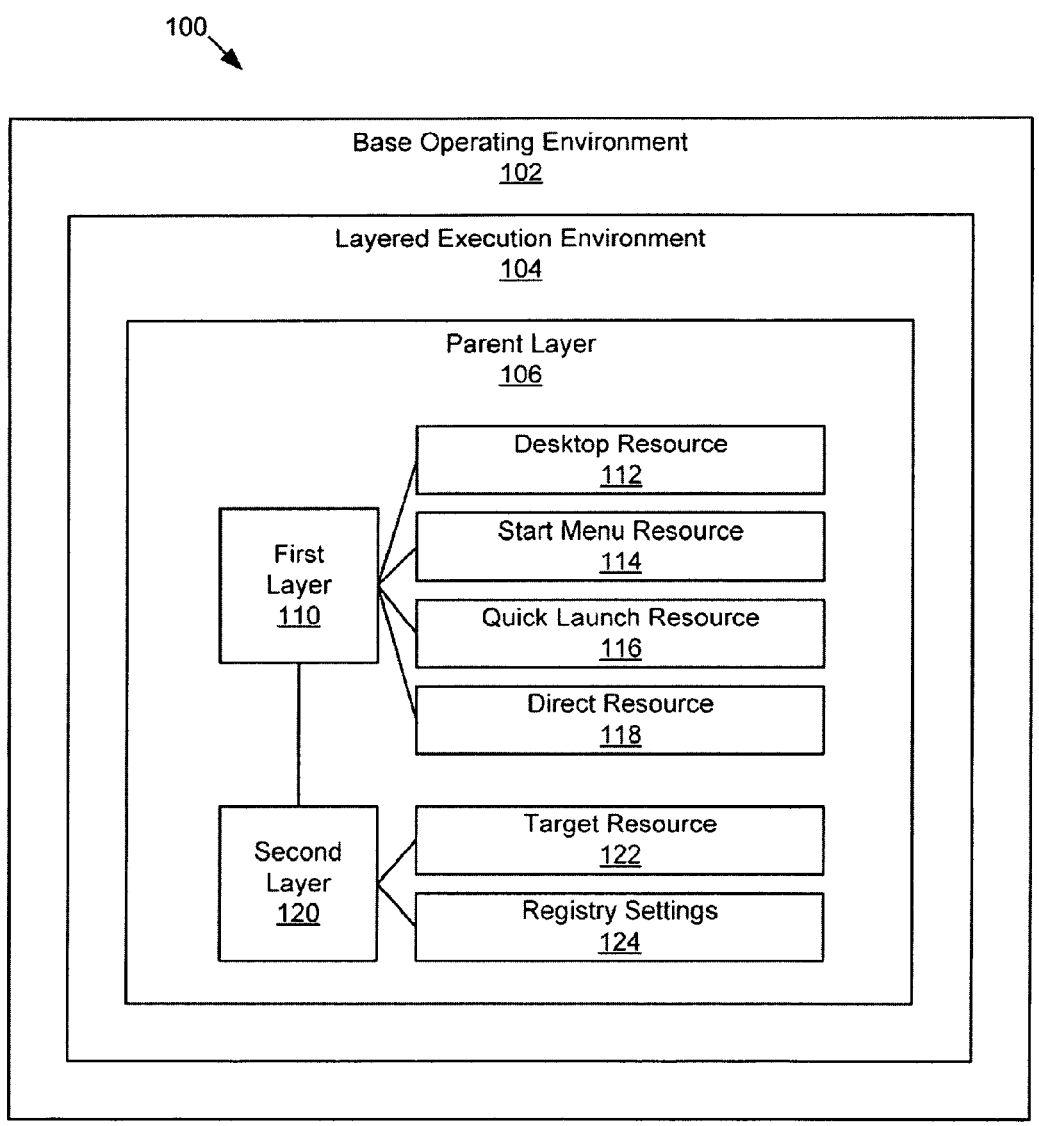
FIG. 1 is a block diagram illustrating one example of a computing system configured for layered execution.

Embodiments described herein will be best understood by reference to the drawings. It will be readily understood that the components generally described and illustrated in the drawings herein, could be arranged and designed in a variety of different configurations. Thus, the following detailed description, as represented in the drawings, is not intended to limit the scope of the disclosure but is merely representative of certain embodiments.

Systems, apparatus, and methods for layered execution are described herein. As used herein, the term "computer program" may refer broadly to any set of computer readable instructions embodied on one or more computer readable media, the instructions being executable by one or more computing devices. Computer programs may include, but are not limited to, applications, subroutines, and operating systems.

The Software Virtualization Solution™ software (SVS software) from Symantec Corporation utilizes layering technology as a form of application virtualization. SVS software enables an application, software data, or other resources to be installed on one or more layers. The layers can be overlaid on an operating environment such that the contents of the layers appear to be installed on the computing system even though the base operating environment is not modified by installation files, registry settings, or the like. Many layers can be overlaid on an operating environment. Each layer can be comprised of sub-layers (e.g., Read-Only and Read/Write layers). Read-only layers can only be read from. Read/write layers can be written to as well as read from. These two layer types mimic permissions of the same type in a typical file system.

The combination of layers and a base operating environment appears as a seamless system to an end user. Changes to the base operating environment by inclusion of a layer are aggregated by the file system through a "filter" driver. From the perspective of an application and the operating system, the aggregated layers are indistinct from a non-layered operating environment.

A layer can either be inactive (i.e., not in use) or active (i.e., in use). When a layer is active, all contents of the layer may be viewed and accessed.

This disclosure is directed to software virtualization and more particularly to systems, apparatus, and methods for layered execution. Certain embodiments are compatible with the Software Virtualization Solution™ software and provide for additional layer types and states.

In one example, a layered execution environment is provided where one or more layers operate over a base operating environment. In one embodiment, the layered execution environment is SVS™ software. Applications, software data, or other resources may be installed on the layers such that the resource appears to be installed on the local system. A first layer of the layered execution environment may be activated. The first layer may include one or more resources that are associated with one or more resources in a second layer. For example, some or all of the resources in the first layer may be shortcuts or links to additional resources in the second layer. In response to requested access to a resource in the first layer, the second layer, which may include the additional resources, may be activated.

The first and second layers may be sub-layers of a parent layer, such that when the first layer is initially activated, the parent layer is in a partially active state. When the second layer is activated, the parent layer may be placed in a fully active state. Subsequently, the second layer may also be deactivated to put the parent layer back into a partially active state.

In certain embodiments, the layering and layered execution environment may be performed in any of the ways disclosed in U.S. patent application Ser. No. 11/528,858, entitled "METHOD AND SYSTEM FOR RUNNING AN APPLICATION IN A CLEAN OPERATING ENVIRONMENT USING A LAYERED COMPUTING SYSTEM," by Randall R. Cook et al., filed on Sep. 28, 2006, and hereby fully incorporated by reference in its entirety.

It should be appreciated that the examples disclosed herein can be implemented in numerous ways, including as one or more processes, apparatuses, systems, devices, methods, computer readable media, or computer program products embodied on computer readable media.

The layered execution systems, apparatus, and methods disclosed herein can improve the efficiency of, and prevent corruption of, an operating environment. For example, when an application is installed onto a computer system via traditional means, many resources of the operating system and associated environment may be modified or augmented with additional resources. Examples of these resources include registry entries, dynamic linked libraries, executables, media files, and other files managed by a file system. When multiple applications are installed, the modifications and additions to the operating environment increase. Consequently, side effects may occur and the computing system may become overloaded to the point of a noticeable performance hit and/or corruption of one of the aforementioned resources.

Furthermore, applications are often removed from a computer system. In many instances, when an application is removed, artifacts of the application remain on the computer though they are of no benefit. Similar to installing many applications, removing an application can create a noticeable performance hit or lead to corruption.

Layered execution enables the installation of an application or other type of software onto a computer system without modifying the base operating environment. Simplistically speaking, a layer can contain an application, be overlaid on the operating environment, and give the appearance of being installed locally on the computer system. However, since the application was installed in a layer, the operating system and associated operating environment remains unchanged. Therefore, when the application is removed or halted, only the layer is affected and not the operating environment. Because the operating environment is not affected, resource corruption and artifacts are avoided.

Turning now to the drawings, FIG. 1 is a block diagram illustrating one example of a computing system 100 (or simply "the system 100") configured for layered execution. As shown, the computing system 100 includes a base operating environment 102, a layered execution environment 104, a parent layer 106, a first layer 110, a desktop resource 112, a start menu resource 114, a quick launch resource 116, a direct resource 118, a second layer 120, a target resource 122, and a set of registry settings 124. The depicted computing system 100 enhances the efficiency of layered execution by deferring activation of the second layer 120 until the target resource 122 within the second layer 120 is requested by a resource in the first layer 110.

In certain embodiments, computing system 100 may include any computer hardware and/or instructions (e.g., software programs), or combinations of software and hardware, configured to perform the processes described herein. In particular, it should be understood that system 100 may include any of a number of well known computing devices, and may employ any of a number of well known computer operating systems, including, but by no means limited to, known versions and/or varieties of Microsoft Windows®, UNIX, Macintosh®, and Linux® operating system software.

Accordingly, the processes described herein may be implemented at least in part as instructions (e.g., one or more computer program products) embodied on one or more computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While a computing system 100 is shown in FIG. 1, the components illustrated in FIG. 1 are not intended to be limiting. Indeed, additional or alternative components, implementations, or computing systems may be used to implement the principles and processes described herein. For the purpose of clarity, generally, only two layers are shown in the Figures and discussed in the description. However, one of skill in the art will appreciate that many layers may be involved and that layers may be logically structured as parent layers and sub-layers.

The base operating environment 102 may include an operating system, file system, and resources stored therein including applications, utilities, scripts, configuration files, data files, links, and shortcuts. In certain embodiments, the base operating environment 102 functions as a computing appliance for a particular market or enterprise.

The layered execution environment 104 includes one or more layers in which particular applications may be executed or data may be accessed without affecting the base operating environment 102. For example, a layer, such as the parent layer 106, may host an application used by a particular user such as a clerk at a bank. All the necessary resources to execute the application may reside within the layer 106 or additional layers associated therewith such as the first layer 110 and the second layer 120. These layers may be selectively activated and overlaid onto the base operating environment 102 instead of modifying the base operating environment 102. Examples of resources stored and accessed in layers include registry entries, executables, scripts, dynamic linked libraries, configuration files, data file, media files, and the like.

In the depicted embodiment, the first and second layers 110, 120 are sub-layers of the parent layer 106. In another embodiment (not shown), the first and second layers 110 and 120 are peer layers with no parent. In one embodiment, the first layer 110 is activated in response to activation of the parent layer 106. The resources on the first layer may be implicitly or explicitly associated with resources on the second layer (or other layers). For example, the resources on the first layer 110 may include one or more shortcuts or links to associated resources on the second layer such as the target resource 122. In another example, (not shown) a data file resides on the first layer 110 that may be edited or accessed by an associated application that resides on the second layer 120.

In the depicted embodiment, desktop resources 112 are overlaid on a desktop directory and displayed on the desktop of the operating environment 102. Similarly, start menu resources 114 may be overlaid and displayed on the "start menu" of the operating environment 102 and quick launch resources 116 may be overlaid and displayed on the "quick launch" menu of the operating environment 102. In certain embodiments, direct resources 118 are overlaid onto an appropriate directory designated by a resource path (not shown). Each of these various types of resources may be overlaid on the base operating environment 102 via the layered execution environment 104.

In certain embodiments, the second layer 120 is activated in response to accessing a resource in the first layer 110 that is explicitly or implicitly associated with a resource in the second layer 120. For example, the first layer 120 may include a shortcut or link to the target resource 122. The desktop resource 112, the start menu resource 114, or the quick launch resource 116 could be such a shortcut or link. In one embodiment, the first layer 110 is utilized as a "shortcut" sub-layer and each resource in the first layer 110 is a shortcut to a resource in another sub-layer such as the second layer 120. In certain embodiments, activation of the second layer 120 moves the parent layer 106 from a partially active state to a fully active state. The resources on the second layer (for example the target resource 122) may include program files, scripts, dynamic linked libraries, configuration files, media files, and the like. In one specific embodiment, each resource on the first layer 110 is a shortcut to an application stored in a layer dedicated to that application.

In certain embodiments, the second layer includes registry settings 124 that are associated with the target resource 122. The target resource 122 and registry settings 124 may be overlaid on the operating environment 102 such that the target resource 122 is accessible to the operating environment 102 and layered execution environment 104 without actually installing the target resource 122 within the operating environment 102. In one embodiment, the second layer 120 becomes deactivated in response to releasing the target resource 122. In one embodiment, if the second layer 120 becomes deactivated, the resource 122 and resource registry settings 124 are no longer overlaid on the operating environment 102. In one embodiment, the first layer 110 remains active in response to deactivating the second layer.

Figure 2:
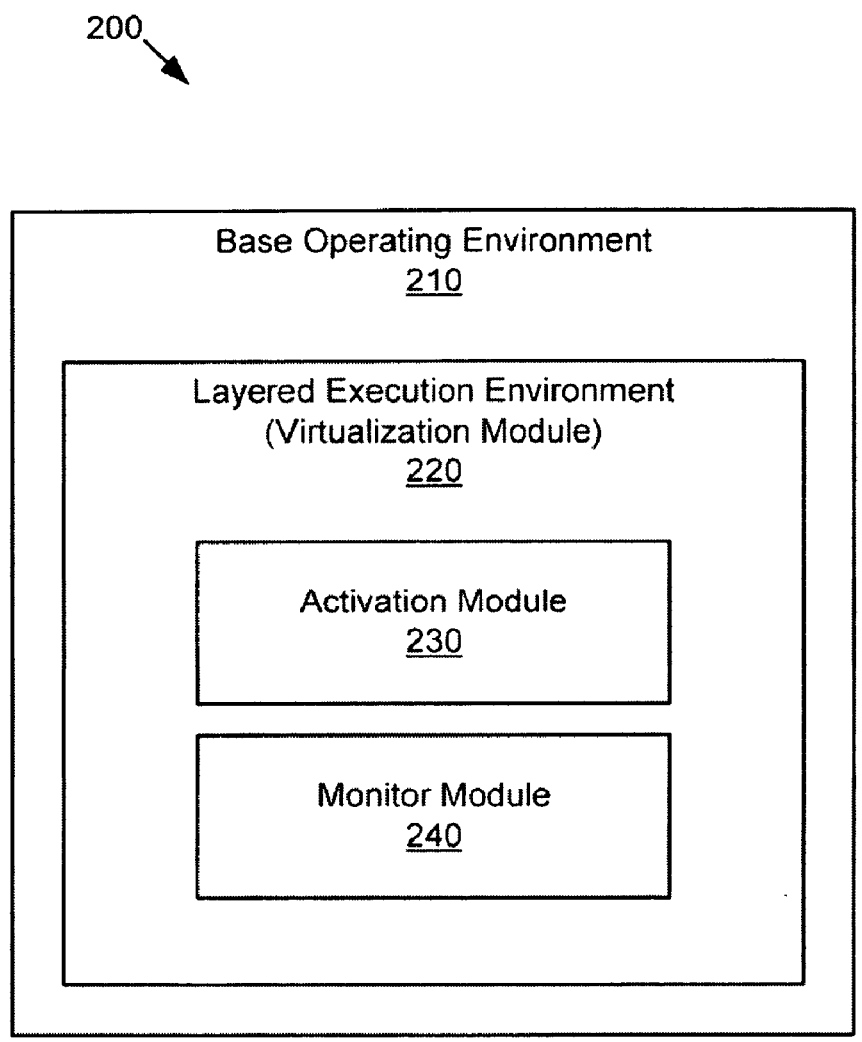
FIG. 2 is a block diagram illustrating one example of a layered execution computing system.

FIG. 2 is a block diagram illustrating one example of a layered execution computing system 200. As shown, the layered execution computing system 200 includes a base operating environment 210, a layered execution environment or virtualization module 220, an activation module 230, and a monitor module 240. The layered execution computing system 200 enables selective activation of execution layers via the activation module 230 and the monitor module 240.

The layered execution environment 220 may comprise layers in which applications are run or data accessed. The layers are overlaid on the operating environment 210 such that usability is seamless; however, the layers prevent the program files of the application or data from permanent inclusion of the resources within the operating environment 210. An application, data file, or other resource may be periodically accessed. To ensure efficiency and prevent corruption, the activation module 230 and monitor module 240 interact with the layers of the layered execution environment 220. In one embodiment, the depicted modules 210, 220, and 230 are components of a filter driver that filters read and write operations to a file system.

The activation module 230 may be configured to activate a first layer in response to a request to load the first layer. The layer may be overlaid on the operating environment 210 such that the contents are available to the computer system as if they were installed on the base operating environment 210. The resources 112, 114, 116, or 118 on the first layer may be available to the user via the desktop, quick launch, start menu, file system explorer, or other user access mechanisms of the operating environment 210. The activation module 230 may be directed by the layered execution environment 210 to keep the first layer active and thereby enabling constant access to resources on the first layer.

The monitor module 240 monitors requests to access layer resources such as the target resource 122 on the second layer 120. For example, a user may select a resource 112, 114, 116, or 118 from the first layer by double clicking on a GUI icon corresponding to the resource. The actions of the user may generate a request by the operating system to open or launch the target resource 122. The monitor module 240 may indicate to the activation module 230 that access to the target resource 122 has been requested. The monitor module 240 may be configured to monitor access to resources that result from user initiated events such as mouse clicks, or system initiated events such as file access by an executable program.

The activation module 230 may be further configured to activate a second layer in response to the monitor module 240 detecting that access to a resource on the second layer (such as the target resource 122) has been requested. In one embodiment, the second layer and the first layer are layers of a parent layer. The parent layer may be partially active in response to the first layer being active, and subsequently become fully active in response to the second layer being activated. The monitoring and activation functionality provided by the depicted modules enable the examples disclosed herein to provide application virtualization in an efficient manner.

Figure 3:
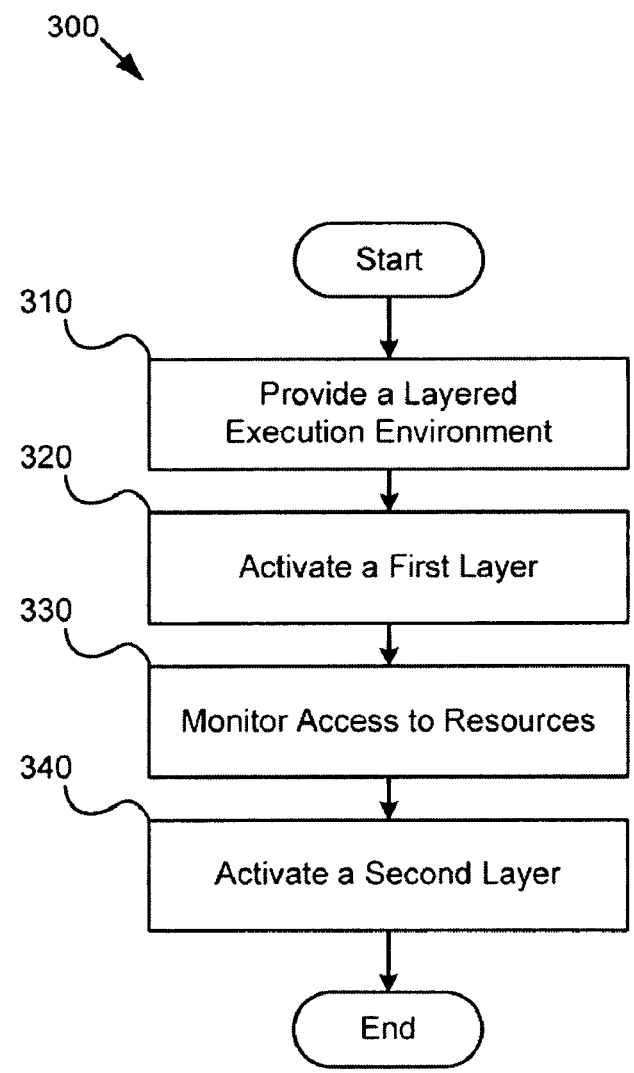
FIG. 3 is a flow chart illustrating one example of a method for layered execution.

FIG. 3 is a flow chart illustrating one example of a method 300 for layered execution. The method 300 includes providing 310 a layered execution environment, activating 320 a first layer, monitoring 320 access to resources, and activating 340 a second layer. The layered execution method 300 illustrates one method of efficiently opening or launching a resource using layering technology. While FIG. 3 illustrates acts according to one embodiment, other embodiments may omit, add to, reorder, and/or modify any of the acts shown in FIG. 3.

In one embodiment, providing 310 a layered execution environment includes configuring a layered execution environment for use with a base operating environment. The layered execution environment enables layers to be overlaid on an operating environment such that any resource on the layer appears to be directly installed within the operating environment; however, the layers are one step removed from the actual base operating environment so the resource does not modify the base operating environment. Layers may be started and stopped. Each layer may supply one or more resources which are overlaid on the base operating environment.

The base operating environment may be a generic environment such as a computing system as shipped from a computer vendor. The base operating environment may be a customized environment associated with a particular enterprise or market. Providing 310 a layered execution environment protects the base operating environment from corruption by a particular application or user.

Activating 320 the first layer may include making the resources on the first layer available. The resources on the first layer may include shortcuts, direct resources, or links to other resources. In one embodiment, the resource on the first layer is a shortcut to an executable file on the second layer. In another embodiment, the resource on the first layer is a data file which may be accessed and/or modified by an executable resource on the second layer.

In one embodiment, activating 320 the first layer refers to activating a layer that is a sub-layer of a parent layer. The parent layer may become partially active when the first layer is activated. If only the first sub-layer of the parent layer is active, then only the resources on the first sub-layer may be immediately available for use. Resources available on the first layer may initiate, open, launch, or otherwise activate an associated resource on the second layer. These resources may be displayed to a user in appropriate locations within the operating environment.

Monitoring 330 access to the first layer may include monitoring access to resources on the first layer. Activating 340 the second layer may occur in response to an indication that access to a resource on the first layer has occurred. The resource on the first layer may be explicitly or implicitly associated with a resource on the second layer. Activating 340 the second layer may include activating the second layer and initiating, opening, launching, or otherwise starting the associated resource on the second layer. In one embodiment, activating 340 the second layer places a parent layer in a completely active state where each sub-layer of the parent layer is active and accessible.

Figure 4:
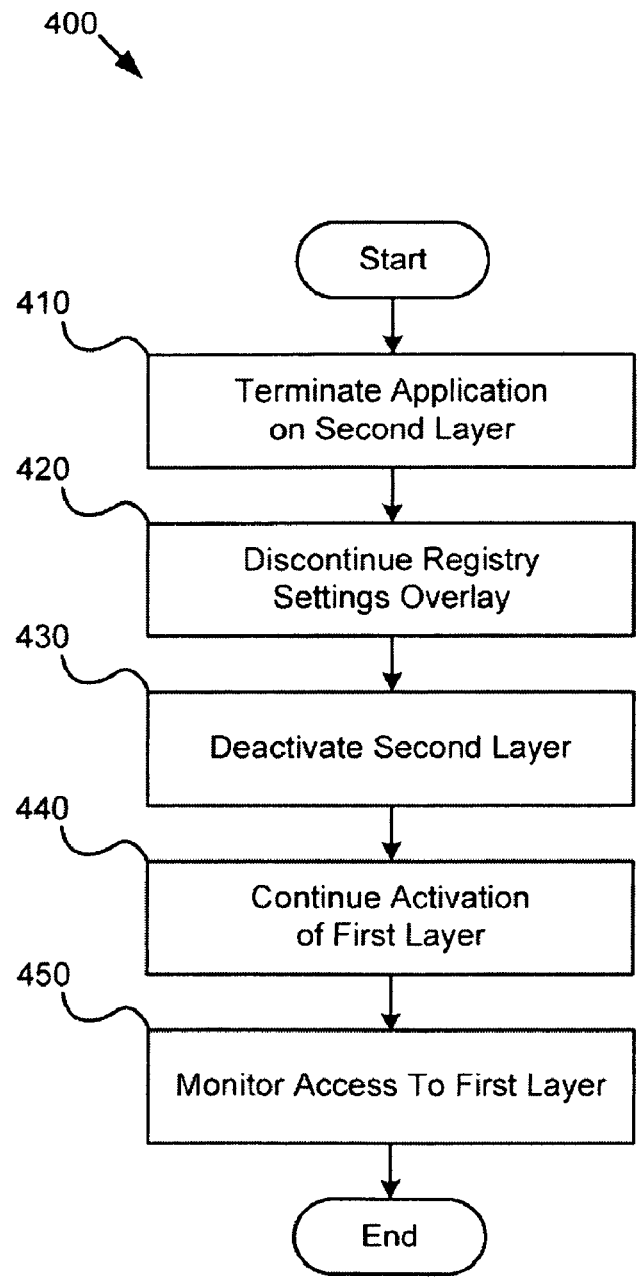
FIG. 4 is a flow chart illustrating one example of a method for partially deactivating a layer in a layered execution environment.

FIG. 4 is a flow chart illustrating one example of a method 400 for partially deactivating a layer in a layered execution environment. The method 400 includes terminating 410 an application on a second (sub) layer, discontinuing 420 to overlay registry settings, deactivating 430 the second layer, continuing 440 activation of a first (sub) layer, and monitoring 450 access to the first layer. The method 400 enables efficient execution in a layered execution environment. While FIG. 4 illustrates acts according to one embodiment, other embodiments may omit, add to, reorder, and/or modify any of the acts shown in FIG. 4.

Terminating 410 the application on the second layer may include any graceful or ungraceful termination of the application. Terminating 410 may include closing the resource after a period of inactivity. Terminating 410 may be specific to the resource on the second layer only and may not affect resources or resources on any other layer. In one embodiment, when the resource on the first layer is a file that is touched by a resource on the second layer, exiting the resource on the first layer may also exit the resource on the second layer.

In one embodiment, discontinuing 420 to overlay registry settings includes removing the overlaid registry settings included in the layer from the operating environment, so they are no longer available to the operating environment. Discontinuing 420 to overlay registry settings may be in response to deactivating 430 the second layer.

Deactivating 430 the second layer may include making all resources associated with the second layer unavailable. In one embodiment, deactivating 430 the second layer includes deactivating the second layer in a manner that keeps the parent layer in a partially active state because the first layer is still active. Deactivating 430 the second layer enables the resource associated with the second layer to become activated again in response to a subsequent access request to an associated resource from the first layer.

Continuing 440 activation of the first layer may include continuing availability of the resources associated with the first layer. In one embodiment, continuing 440 activation of the first layer includes keeping the first layer overlaid on the operating environment such that resources on the first layer are still available for access.

Monitoring 450 access may include monitoring file system requests to open resources on the first layer. The requests may occur in response to a user initiated event such as a mouse click or a system initiated event such as a file open operation initiated by a program.

Figure 5:
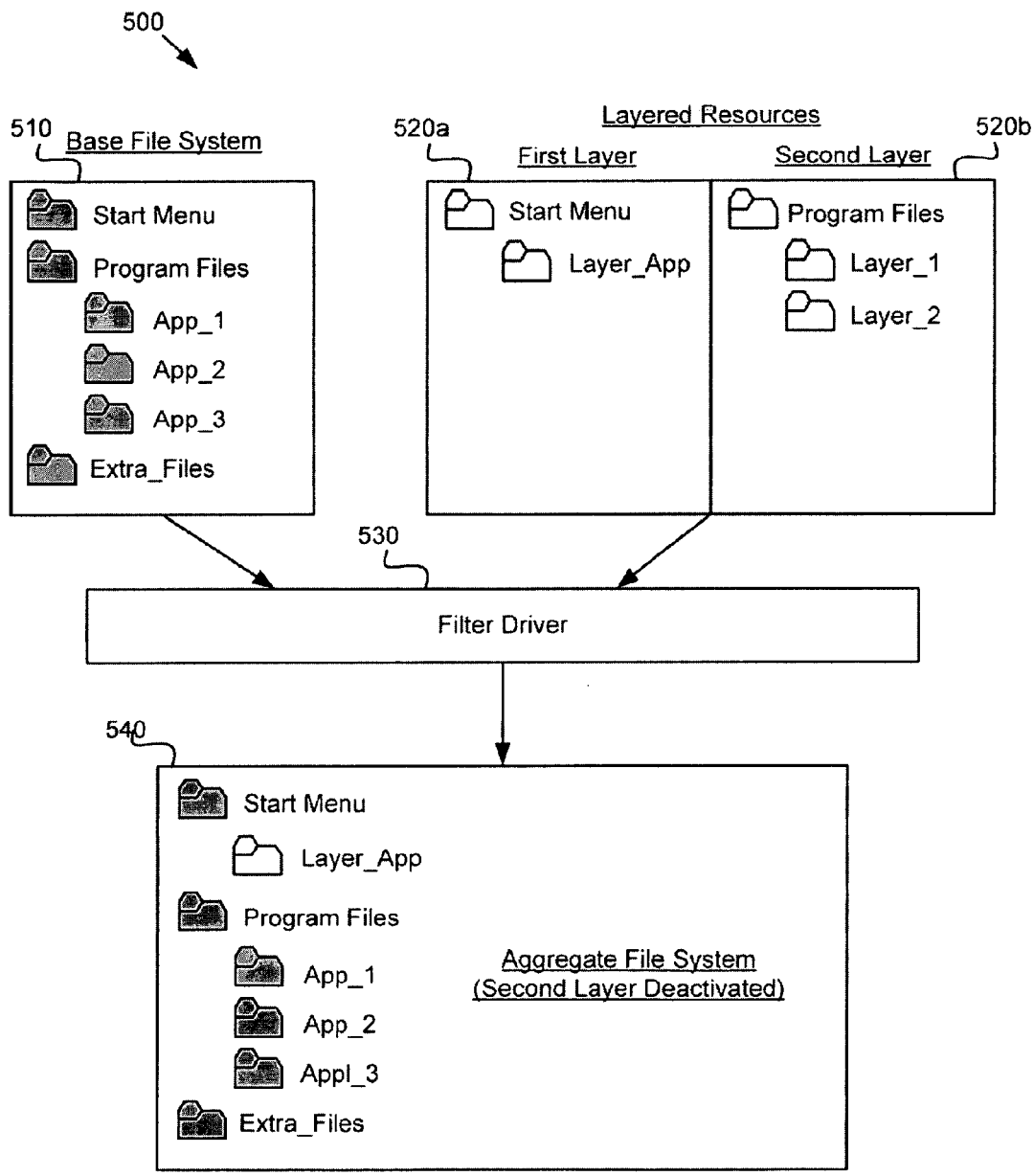
FIG. 5 is a block diagram illustrating one example of an aggregate file system with an overlaid parent layer having an active first layer.

FIG. 5 is a block diagram illustrating one example of an aggregate view 500 of a file system in an operating environment with an overlaid parent layer having an active first layer. The aggregate view 500 includes a base file system 510, layered resources 520, a filter driver 530, and an aggregate file system 540. The aggregate view 500 shows how the file system is viewed when only the first layer is active.

In one embodiment, the base file system 510 includes operating system files and other files associated with a base operating environment such as data files and applications installed locally on the computing system. The depicted base file system 510 shows a folder structure of the "Start Menu," "Program Files," and "Extra Files." The descendant folders of "Program Files" are shown to illustrate programs installed locally on the operating system. In the depicted embodiment, "App_1," "App_2," and "App_3" are programs installed on the local system. Descendants of the "Start Menu" folder illustrate applications and/or shortcuts installed in a start menu folder of the operating system.

The layered resources 520 may include resources contained within a first layer 520a and a second layer 520b. In one embodiment, each layer corresponds to a directory on a local or remote volume. The first layer 520a and the second layer 520b may be layers of a parent layer (not shown). The first layer 520a may include shortcuts to a resource included in the second layer 520b. In the depicted embodiment, the first layer includes a "Start Menu" folder which contains a "Layer_App" folder which is shown to illustrate the "Layer_App" shortcut in the start menu. The first layer may be activated independently of the second layer. The second layer may include applications, data files, or other resources. In the depicted embodiment, the second layer comprises "Program Files" illustrating the programs installed on the second layer, "Layer_1" and "Layer_2."

The filter driver 530 may aggregate the layered resources on top of the base operating environment thus providing an aggregate file system 540 from the perspective of the operating system, which in turns provides an aggregated view to the user. In the depicted embodiment, since the first layer is active, the shortcuts located on the file system of the first layer are made available to the user by the operating system through the filter driver 530.

Figure 6:
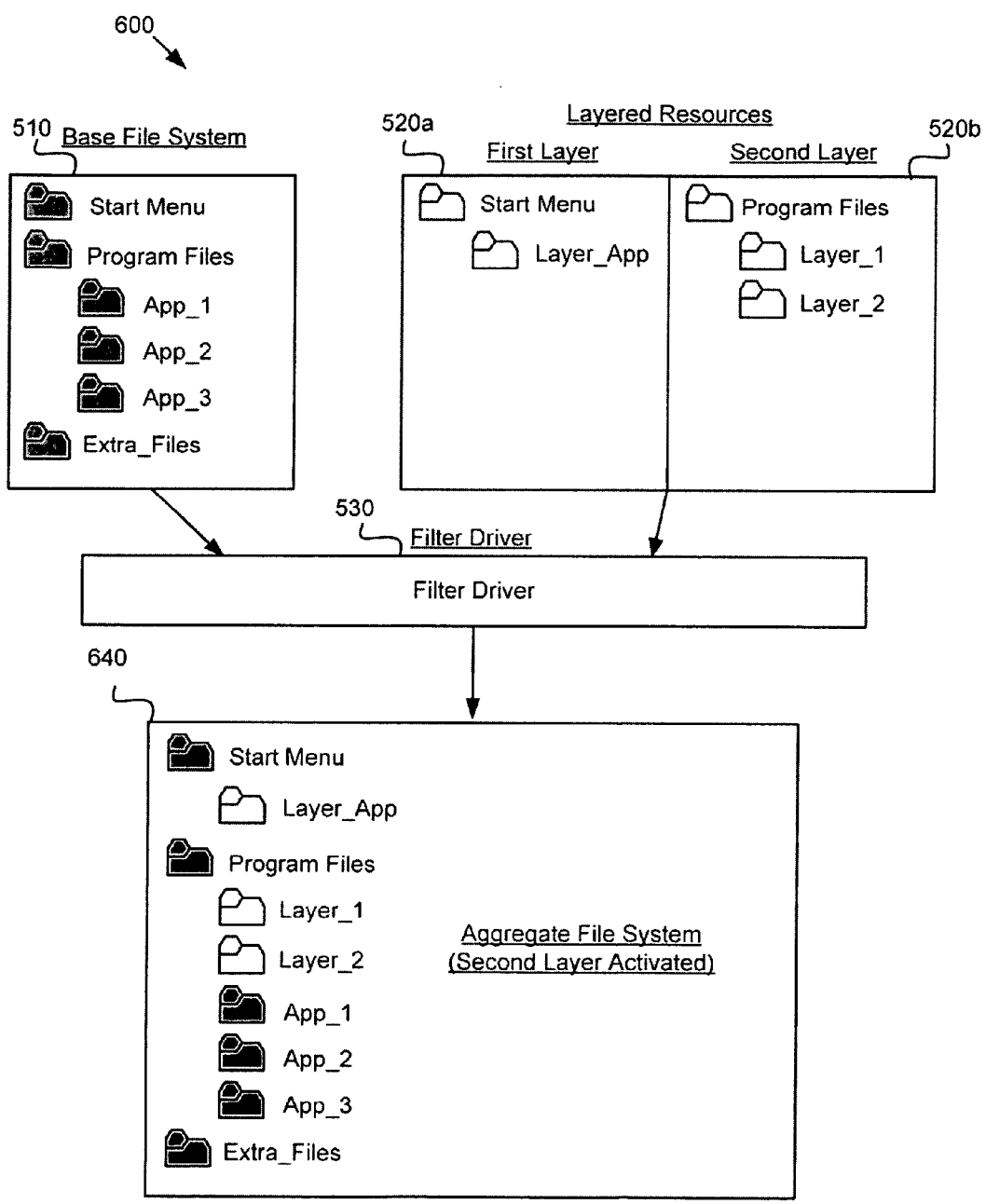
FIG. 6 is a block diagram illustrating one example of an aggregate file system with an overlaid parent layer having active first and second layers.

FIG. 6 is a block diagram illustrating one example of an aggregate view 600 of a file system in an operating environment with an overlaid parent layer having active first and second layers. The aggregate view 600 includes many of the same elements as the aggregate view 500 including the base file system 510, the layered resources 520, and the filter driver 530. The aggregate view 600 shows how the file system may be viewed when both the first layer and second layer are active resulting in an aggregate file system 640.

The aggregate file system 640 is available to the operating system and may be displayed to an end user through a file explorer, desktop, or the like. In the depicted embodiment, since the first layer is active, the shortcut resources located in the first layer are available to the operating system through the filter driver 530. In the depicted embodiment, since the second layer is also active, the program files of the second layer are also available to the operating system through the filter driver 530. Although not depicted, other files, registry database entries, and the like may be overlaid onto the operating environment and accessed by the operating system. The aggregate file system 640 shows the file structure with the merger of the base file system 510 and the layered resources 520 through the filter driver 530. As depicted, the "Layer_1" program, the "Layer_2" program, and the "Layer_App" start menu item are all visible in the aggregate file system 640.

The preceding description has been presented only to illustrate and describe embodiments and implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A method for layered execution, the method comprising:
providing a layered execution environment comprising at least one layer that operates over a base operating environment and is used for installing at least one application to be run on the base operating environment such that the base operating environment is not modified;
activating a first layer of the layered execution environment, wherein the first layer provides access to a resource within the first layer of the layered execution environment;
monitoring access to the resource within the first layer of the layered execution environment; and
activating a second layer of the layered execution environment in response to detecting access to the resource within the first layer of the layered execution environment.

2. The method of claim 1, wherein the second layer comprises additional resources associated with the resources within the first layer.

3. The method of claim 1, wherein the first layer and second layer are layers of a parent layer.

4. The method of claim 1, wherein access to the resource comprises an open operation.

5. The method of claim 1, wherein access to the resource comprises a launch operation.

6. The method of claim 1, further comprising deactivating the second layer in response to terminating a process started by accessing the resource.

7. The method of claim 1, wherein the resource on the first layer is a shortcut to a resource on the second layer.

8. A system for layered execution, the system comprising:
a software virtualization solution configured to provide a layered execution environment comprising at least one layer that operates over a base operating environment and is used for installing at least one application to be run on the base operating environment such that the base operating environment is not modified;

at least one processor configured to execute the software virtualization solution;

wherein the software virtualization solution is further configured to activate a first layer of the layered execution environment, wherein the first layer provides access to a resource within the first layer of the layered execution environment;

wherein the software virtualization solution is further configured to monitor access to the resource within the first layer of the layered execution environment; and wherein the software virtualization solution is further configured to activate a second layer of the layered execution environment in response to detecting access to the resource within the first layer of the layered execution environment.

9. The system of claim 8, wherein the second layer comprises additional resources associated with the resource within the first layer.

10. The system of claim 8, wherein the first layer and second layer are layers of a parent layer.

11. The system of claim 8, wherein access to the resource comprises an open operation.

12. The system of claim 8, wherein access to the resource comprises a launch operation.

13. The system of claim 8, wherein the software virtualization solution is further configured to deactivate the second layer in response to terminating a process started by accessing the resource.

14. The system of claim 8, wherein the resource within the first layer is a resource selected from the group consisting of a shortcut, a link, a startup menu entry, and a file.

15. An apparatus for layered execution, the apparatus comprising:
   a virtualization module configured to provide a layered execution environment comprising at least one layer that operates over a base operating environment and is used for installing at least one application to be run on the base operating environment such that the base operating environment is not modified;
   an activation module configured to activate a first layer of the layered execution environment, wherein the first layer provides access to a resource within the first layer of the layered execution environment;
   a monitor module configured to monitor access to the resource within the first layer of the layered execution environment; and
   at least one processor configured to execute at least the virtualization module, the activation module, and the monitor module;
   wherein the activation module is further configured to activate a second layer of the layered execution environment in response to detecting access to the resource within the first layer of the layered execution environment.

16. The apparatus of claim 15, wherein the second layer comprises additional resources associated with the resource within the first layer.

17. The apparatus of claim 15, wherein the first layer and second layer are layers of a parent layer.

18. The apparatus of claim 15, wherein access to the resource comprises an open operation.

19. The apparatus of claim 15, wherein access to the resource comprises a launch operation.

20. The apparatus of claim 15, further comprising a deactivation module configured to deactivate the second layer in response to terminating a process started by accessing the resource.

* * * * *